June 16, 1953 — F. J. DOHRER — 2,642,152
CENTRIFUGAL DUST AND CINDER COLLECTOR
Filed May 9, 1950 — 2 Sheets-Sheet 1
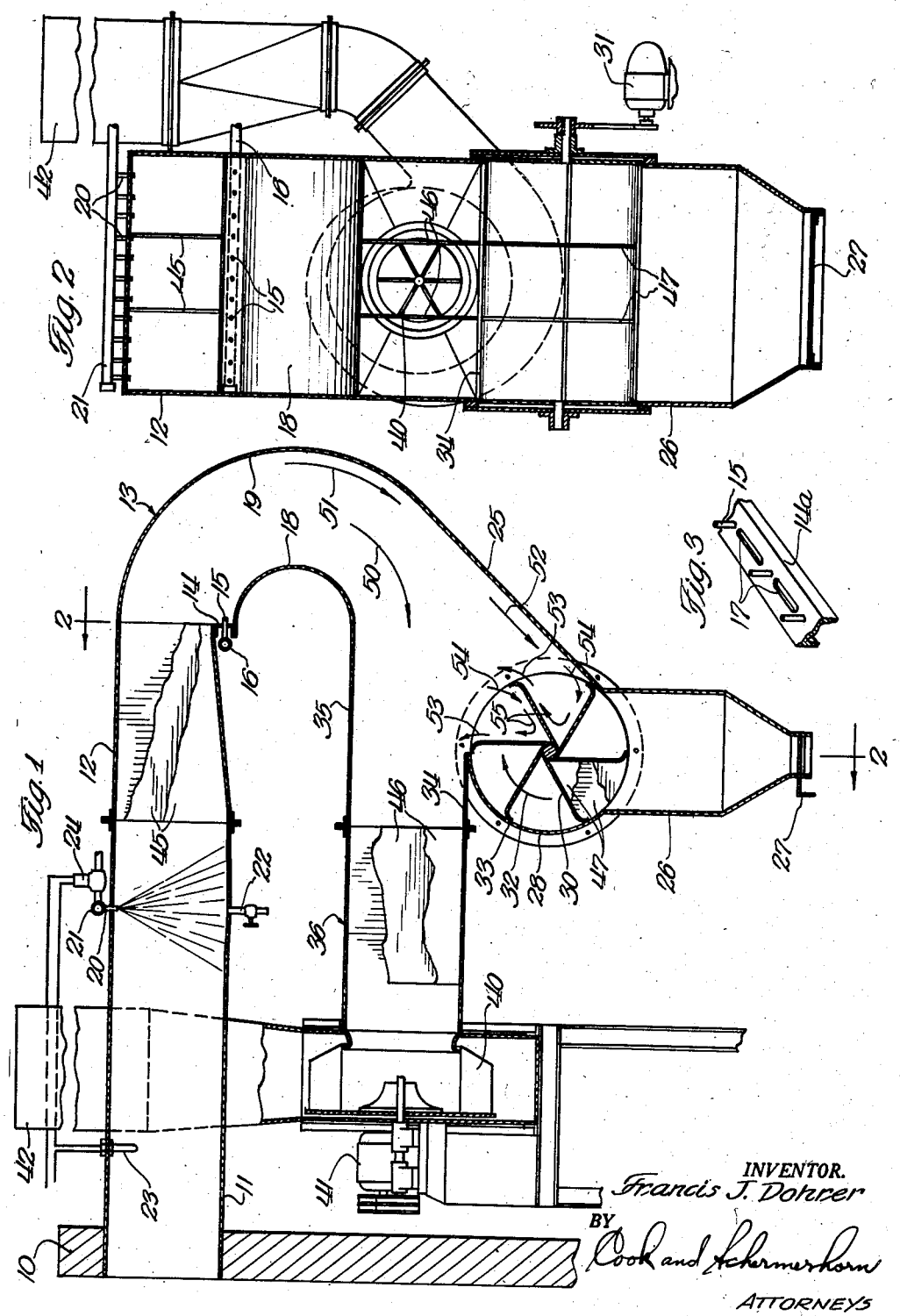
INVENTOR.
Francis J. Dohrer
BY Cook and Schermerhorn
ATTORNEYS

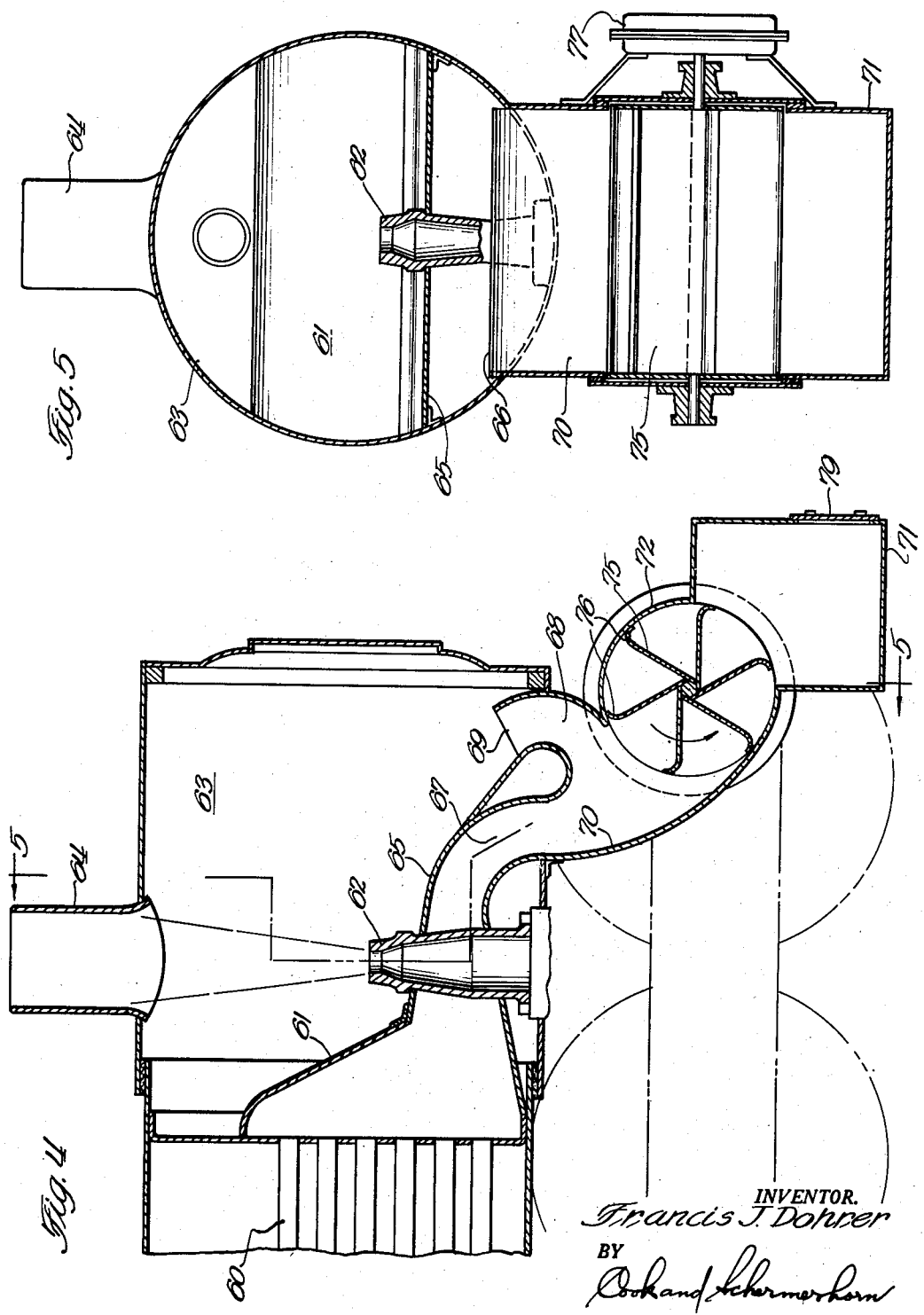

Patented June 16, 1953

2,642,152

UNITED STATES PATENT OFFICE 2,642,152

CENTRIFUGAL DUST AND CINDER COLLECTOR

Francis J. Dohrer, Seattle, Wash.

Application May 9, 1950, Serial No. 160,993

12 Claims. (Cl. 183—79)

This invention relates to apparatus for removing dust or cinders from a gas stream and is applicable to ventilating systems, boiler furnaces and other sources of dust laden gases.

The cinders from wood waste fired boilers are particularly objectionable in the neighborhood in which such boilers are located. Fuel of this type is usually in the form of hogged wood or mixed chips and sawdust which, during combustion, produces cinders and dust consisting of charred wood, charcoal and fly ash of relatively light specific gravity. Certain industrial processes also discharge air streams into the atmosphere carrying other kinds of nuisance dusts such as cement, dust from grains and husks, wood flour, sander dust and the like. Coal fired boilers also discharge objectionable cinders and dust into the atmosphere. From time to time attention has been given to the problem of keeping such materials out of the atmosphere, but there are still many boilers and industrial processes in existence which continue to contaminate the atmosphere in the city and countryside.

The chief reason for the continued pollution of the atmosphere is the lack of satisfactory available equipment for removing the objectionable material. Known dust collectors and air cleaning apparatus have numerous disadvantages and objections to account for their non-use, such as high cost of installation, high cost of operation and maintenance, inability to operate continuously and handle a large volume of solid material, inability to reduce the dust to a form capable of convenient disposal, inability to handle high temperature gases, and the creation of excessive back pressures in the draft or ventilating system.

The principal objects of the invention are, therefore, to provide a dust and cinder collector to overcome the disadvantages and shortcomings of conventional equipment hereinabove pointed out. Further objects are to provide a collector having a single streamlined turn for the flow of gases to separate solid matter from the gas stream by centrifugal force without any other obstruction to impede the gas flow and create a pressure loss, to provide a collector which may be operated either as a wet or dry type collector, to provide a collector having relatively few moving parts with small power requirements, to provide a collector that can be adapted to suit any particular plant already in existence, to provide a collector which can be used either in an induced draft under sub-atmospheric pressure, in a blower system under greater than atmospheric pressure, or in a natural draft system, discharging either hot or cold gases, and to provide a collector which is suitable for use as a rougher to remove all but micronic sized dust from a gas stream which is to be finally cleaned by an electric precipitator.

In the present apparatus, the principal separating action occurs in a 180° bend of the gas passage wherein any solid matter in the gas stream is thrown against or toward the outer peripheral wall of the passage so as to leave the main stream relatively clean. The action of centrifugal force may be assisted by air or steam jets, and, if a wet separation is desired, water sprays may be used. At a point tangential to the main stream of gas as it completes its semicircular turn, the stratified or separated dust particles encounter a rotor of novel design which removes the solid material from the casing and effects a gas seal between such casing and the depository receptacle. In the illustrated embodiments of the invention, the gas is drawn through the system by induced draft, but the lack of obstruction and relatively low back pressure in the system make it well adapted for use under natural draft, or under pressures above atmospheric, if desired. Two different embodiments of the invention are illustrated, one involving an installation on a stationary wood waste fired boiler, and the other being applied to a coal burning locomotive.

These and other objects and advantages will become apparent and the invention will be better understood with reference to the illustrated embodiments shown in the accompanying drawings and described in the following specification, but it is to be understood that the drawings are for the purpose of illustration only and are not intended to limit the invention. Various changes may be made in the construction and arrangement of parts, and certain features may be used without others, to adapt the invention to different purposes, including the treatment of gases, other than combustion gases, derived from various types of industrial processes.

In the drawings:

Figure 1 is a sectional view in side elevation showing a typical installation for cleaning the flue gases from an induced draft boiler burning pulverized coal or wood waste;

Figure 2 is a sectional view taken on the line 2—2 of Figure 1;

Figure 3 is a fragmentary view of an alternative feature for the embodiment shown in Figures 1 and 2;

Figure 4 is a longitudinal sectional view of the front end or "smoke box" of a coal burning locomotive installation illustrating another application of the principles of the invention; and Figure 5 is a sectional view taken approximately on the line 5—5 of Figure 4.

*Embodiment of Figures 1 and 2*

Referring first to Figure 1, the numeral 10 designates the rear brick wall of the combustion chamber of a stationary boiler. The combustion gases leave the boiler through breeching 11 which connects with an intake section 12 at the entrance to the collector casing 13. The casing 13 makes a 180° downward and reverse turn, and the intake section 12 tapers in the direction of flow to reduce the cross sectional area so that the velocity of gases entering the collector casing is increased, causing solid matter to be thrown to the outer periphery of the casing, first by momentum, and then, later, by centrifugal force. The bottom wall of the section 12 inclines upwardly to deflect the gas stream upwardly against the upper and outer wall of casing 13 as it enters this casing.

At the beginning of the turn in collector casing 13, and under the elevated rear end of the bottom wall of intake section 12, there is provided a transverse channel plate carrying a plurality of nozzles 15 supplied by a manifold pipe 16. These nozzles may be used to spray either water or steam into the dust laden air stream, whereby the force of the spray will tend to drive the dust and cinders against the outside wall of the casing 13 to assist the primary action of momentum and the secondary action of centrifugal force. Water sprays have the advantage of reducing the temperature of the gases to make them cool enough for final cleaning in an electric precipitator, if desired.

When dry collection is desired, the channel plate 14 may take the form shown at 14a in Figure 3, wherein slots 17 are provided to admit outside air instead of water or steam. When the system is operated by induced draft at reduced pressure, the outside air trying to get into the casing 13 flows through the slots 17 in flat jets to form a layer of clean air along the adjacent wall 18 at the inside of the turn crowding the dust laden air toward the wall 19 on the outside of the turn. In such case, the channel plate 14a may, nevertheless, still be equipped with the nozzles 15, but these nozzles would then be used only for fire protection, and would not function in normal operation.

Preferably, the breeching 11 is also equipped with a plurality of water or steam nozzles 20 on a supply pipe 21 to extinguish a secondary fire in the breeching. Such fires occasionally occur from ignition of unburned combustible gases leaving the boiler, and combustion at this point is objectionable as it would damage the collector. The nozzles 20 may be turned on automatically by a solenoid valve 24 actuated by conventional thermostats 23 or fuse links (not shown) responsive to abnormal temperature in the breeching, causing the sprays from the nozzles to act in the same manner as well known sprinkler systems which are used for fire protection. Immediately beneath the nozzles 20 there is a slight depression in the bottom wall of breeching 11 which is equipped with a drain 22 for removing the water whenever the sprays are operated. In a dry type of collector, where the nozzles 15 are not operating continuously, they may be turned on for fire protection concurrently with the nozzles 20 by the same valve 24, the pipe 16 then being supplied from pipe 21. Either steam or water is effective for smothering a secondary fire.

The circular wall 19 on the outer side of the curve of the collector casing 13 extends tangentially downward at an angle by way of plate 25 to a cinder hopper 26. In dry collection, the cinders may be removed continuously by a screw conveyor or other suitable means, or they may be retained in this hopper by means of a bottom slide gate 27 which may be withdrawn to dump the cinders from time to time. In wet collection, the bottom of the hopper may be connected with a suitable duct to carry away the water and cinders together.

The rear side of the cinder hopper 26 has an arcuate wall 28 concentric with the axis of a rotor 30. The rotor 30 is belt driven from a suitable source of power such as the motor 31 to rotate in the direction of arrow 32. The rotor has a number of flat radial blades with rearwardly curved tips which substantially engage the arcuate wall 28 on one side and the lower end of wall 25 on the other side to separate the casing 13 from the cinder hopper 26. Sufficient running clearance is provided to prevent binding of the rotor from expansion and contraction in heating and cooling. In the illustrated embodiment, the top of the rotor is substantially tangential to the bottom wall 34 at the outlet end of the casing 13, whereby the sloping wall 25 provides a considerable enlargement of the cross sectional area of the casing 13 where the gas stream approaches the rotor 30. The inner wall 18 of casing 13 is tangential to a horizontal top wall 35 at the outlet end of the casing which is spaced from the bottom wall 34 to provide approximately the same cross sectional area as in the bend ahead of the inclined plate 25.

A transition section 36 connects the discharge end of casing 13 with the circular intake opening of a centrifugal fan 40. The fan 40 is driven by a motor 41 to draw the gases from the boiler through the collector casing 13 and discharge them upwardly through the exhaust stack 42. This arrangement permits the stack 42 to be located conveniently close to the boiler wall 10.

Horizontally spaced vertical partition plates are provided at several different points in the gas passage. The transition section 12 carries parallel vertical plates 45 and the transition section 36 carries parallel vertical plates 46. Likewise, the rotor 30 is equipped with partition plates 47 perpendicular to the rotor axis. All partition plates are parallel with the vertical center line of the collector and rotor in such a manner as to cause gas to flow in multiple separate channels or compartments, thus preventing cross currents and turbulent eddies.

*Operation—Figures 1 and 2*

The main gas flow through the casing 13 is designated by the arrow 50 in the center of the channel. In the present system, this gas flow is induced by the suction fan 40, but the duct system may also be arranged to operate under blower pressure or natural draft, if desired. The downward curvature of casing 13 causes the bulk of the particulate matter, such as dust and cinders, to hug the outer wall of the curve, as indicated by the arrow 51, under the action of momentum and centrifugal force assisted by steam or water jets from the nozzles 15 or air jets through the slots 17 shown in Figure 3. The larger and heavier particles actually impinge against the outer wall 19 and are thereby retarded in velocity to such an extent that they slide down the inclined plate 25 and are immediately removed from the influence of the main gas stream.

Much of the finer dust may not actually impinge against the outer wall 19 to be retarded directly by friction of the wall against the particles, but the combined actions of centrifugal force and jets from the channel plate 14 drive this material into a slower moving boundary layer close to the outer wall, where the gas stream itself is retarded by skin friction in characteristic lamellar flow and loses its transporting power for solid material. This material also, therefore, follows the inclined plate 25, a large part of it taking the direction of arrow 52. Such material approaches the rotor 30 in a region where the casing 13 is expanding in cross sectional area to cause still further reduction in the velocity and transporting power of the gas. With this reduction in velocity, much of the medium sized material settles out immediately, falling away from the main flow of the gas stream and toward the relatively quiescent zone at the lower end of inclined plate 25. Under conditions of streamlined flow the main stream at 50 is not reduced in velocity in passing through the expansion chamber, but is drawn directly toward the source of suction in the eye of fan 40 as though it were confined in a parallel walled channel.

The rotation of rotor 30 in the direction of arrow 32 causes the curved ends 33 of the blades to displace a certain amount of gas outwardly from the rotor on the front sides of the blades, as indicated by the arrows 53. This produces an outward flow along the front surface of each blade, as in a pump or blower impeller, which is supplied or replaced by an inward flow along the back side of each blade, as indicated by arrows 54. At the center of the rotor in each space between the blades this inward flow must reverse abruptly, as indicated by the arrows 55. Hence, it will be apparent that the inward flows at 54 drop some of their load of the still suspended finer particles when these flows make the abrupt turn at 55. Any particulate matter which impinges against the rotor blades in this abrupt turn has its velocity so reduced by friction that it cannot follow the upward flow to escape from the rotor with the air leaving at 53, and hence these streams consist of relatively clean gas.

The rotor speed for a particular installation is adjusted by motor 31 or by the ratio of its driving connection so that all material in the rotor immediately drops into the hopper 26 before it can be carried out of the rotor by more incoming air. Each rotor pocket turns from a position communicating with casing 13 to an inverted position in chamber 26 in the time required for the bulk of the entering airborne dust to travel in to the center of the rotor. As soon as a rotor blade passes wall 25, any dust then about to leave the rotor is directed into chamber 26 along with the pocketed material already dropped from suspension in the gas. In this way, only the smoke itself and fine impalpable powders are carried out with the gas flows at 53 to be discharged from the exhaust stack 42. In wet separation, the wet atmosphere and wet surfaces contribute further to the entrapment of the fine dust.

The inward gas flows at 54 are found to be effective in drawing dust laden gas into the rotor 30, notwithstanding the adjacent presence of the two outward flows 53 which might appear to neutralize any beneficial suction effects of this rotor. When the rotor 30 is stopped it is found that buoyant material in the gas stream is immediately discharged through the section 36 and when the rotor is started again such material is deposited in chamber 26.

With turbulence eliminated as much as possible by the use of a suction fan and dividers 45 and 46, the gas flow is pulled through the casing 13 in a streamlined path of promote the concentration of dust in lamellar flow along the walls 19 and 25. The focal point of the gas flow as it rounds the return bend is the eye of suction fan 40 whereby the particulate matter which cannot turn so abruptly follows the downwardly inclined wall 25 on a path divergent from the main stream and becomes separated therefrom. The local gas flows at 53 and 54 do not create objectionable turbulence in the main flow but they do have a net suction effect on dust particles entering the more quiescent atmosphere at a distance below the main flow because the dust particles are drawn into the rotor 30 where they are trapped before they can escape, and are then discharged into quiescent chamber 26.

The type of collector illustrated in Figures 1 and 2 has been installed on a 214 horse power boiler operating up to 250% of boiler rating on hogged fuel and wood waste. The dust and cinders are so effectively removed from the exit boiler gases that no deposits are apparent on flat top roofs in the neighborhood. Prior to installation of the present collector this boiler was considered a nuisance in the neighborhood because it sprayed cinders over a five block radius in dry weather while operating at not over 150% of boiler rating.

*Embodiment of Figures 4 and 5*

Figures 4 and 5 illustrate the principles of the invention applied to a coal burning locomotive. The numeral 60 designates a conventional fire tube boiler having a curved sheet or hood 61 forming a flue at its front end. An induced draft is drawn through the flue and fire box by means of a steam injector nozzle 62 mounted at the bottom of the smoke chamber 63 in vertical alignment beneath the stack 64. Exhaust gas from the driving cylinders issuing from the nozzle 62 in a sharply defined conical jet creates a reduced pressure in the smoke chamber 63 to exhaust the smoke through the stack 64 along with the steam and produce the desired draft. On a conventional locomotive, the smoke chamber 63 is equipped with large screens to intercept sparks before they reach the stack 64. Such screens are not effective to prevent small burning coals and great quantities of cinders from being discharged out of the stack.

In the present construction, upper and lower curved sheets 65 and 66 define a continuation of the flue, making a right angle downward bend at 67. This flue subsequently makes a 180° upward bend at 68 to discharge into the smoke chamber 63 through an outlet 69. The bottom wall 66 of this flue inclines downwardly at 70 and connects with an air-tight cinder box 71. Connected with the top wall of the cinder box is an arcuate wall 72 concentric with the axis of rotor 75. The rotor 75 is similar to the rotor 30 in Figure 1, having a number of radial blades with curved ends 76 substantially engaging the walls 70 and 72 to isolate the cinder box 71 from the flue and smoke chamber. The rotor 75 is most conveniently driven in the direction indicated by a small steam turbine 77 through suitable reduction gears, not shown. Numeral 79 designates a clean-out door for the cinder box.

In a locomotive installation, the chief concern is to remove the cinders and sparks which are hard and gritty and constitute a fire hazard. There is relatively little fine dust or fly ash, as in the case of a wood waste fired boiler.

The cinders carried in the flue gases are directed downwardly by the bend in the flue at 67, so as to impinge forcibly against the blades of the rotor 75. The cinders are immediately trapped by the revolving blades and deposited in the cinder box 71 before they can turn upwardly to escape from the rotor. The flue gases make a sharp reverse bend at 68 and are discharged through the opening 69 substantially free of cinders. Effective separating action results from the inability of the downwardly moving cinders to follow the reverse bend at 68, and the entrapment of the particles by the rotation of the rotor blades so that they cannot be swept out by the gas stream. As soon as the particles strike a solid surface, their velocity is so reduced that they cannot be carried further as suspended matter, especially to turn abruptly in an upward direction, as is required to escape through the outlet 69.

This type of cinder collector leaves the flue free and open in both embodiments and does not impair the draft.

Having now described my invention and in what manner the same may be used, what I claim as new and desire to protect by Letters Patent is:

1. In a dust collector, a casing having a gas passage with a downward return bend for concentrating particulate matter carried by a gas stream flowing through the casing along the outer wall of said bend, means to crowd the particulate matter more closely against said outer wall comprising a series of nozzle orifices carried by the inner wall of the bend for directing fluid jets toward said outer wall, said outer wall having a downwardly sloping portion forming an expanding chamber on the bottom side of said return bend, a radial rotor having its top portion extending into said expanding chamber and a lower portion tangent to said outer wall to intercept particulate matter flowing along said wall, a dust collection chamber communicating with the bottom portion of said rotor, and walls enclosing the remaining portion of said rotor between said collection chamber and said expanding chamber to isolate said collecting chamber and form a seal between said gas passage and atmosphere.

2. A dust and cinder collector for flue gases and the like, comprising a gas passage having a horizontal inlet duct with a downward return bend and a lower horizontal outlet duct portion beneath said inlet duct, fluid pressure orifices in the inside wall of said bend for directing fluid pressure jets toward the outer wall of said bend, said outer wall having a downwardly inclined portion extending below said lower horizontal outlet duct portion and defining an expansion chamber at the juncture of said return bend and said lower horizontal outlet duct portion, a radial blade rotor mounted below said lower horizontal duct portion and having a rotor portion disposed in said expansion chamber without obstructing said gas passage, a lower portion of said rotor being tangential to said downwardly inclined wall, and a suction fan having its input connected with said lower horizontal outlet duct portion for drawing said flue gases through said gas passage under sub-atmospheric pressure.

3. A collector for removing dust, fly ash and the like from a stream of gas comprising an expansion chamber having inlet and outlet passageways for said stream of gas and a power driven radial blade rotor, said rotor being mounted at the bottom of said chamber and said inlet passageway being directed toward an upper portion of said rotor, said inlet passageway having an outwardly curved downwardly sloping bottom wall approximately tangent to a lower portion of said rotor and said outlet passageway having a bottom wall approximately tangent to an upper portion of said rotor, additional walls for said chamber and passageways connected with said bottom walls defining a clear and unobstructed curved channel for said gas stream through said inlet and outlet passageways and through said expansion chamber above said rotor, a quiescent dust collection chamber communicating with a bottom portion of said rotor, and walls enclosing the remaining portions of said rotor between said expansion chamber and said quiescent collection chamber, the tip ends of the rotor blades being curved rearwardly relative to the direction of rotation, the under side of said rotor turning in the direction of movement of said gas stream and the upper side turning counter to said direction.

4. A collector for removing dust, fly ash and the like from a stream of gas comprising an expansion chamber having inlet and outlet passageways for said stream of gas and a power driven radial blade rotor, said rotor being mounted at the bottom of said chamber and said inlet passageway being directed toward an upper portion of said rotor, said inlet passageway having an outwardly curved, downwardly sloping bottom wall approaching a lower portion of the periphery of said rotor and said outlet passageway having a bottom wall extending downstream away from an upper portion of the periphery of said rotor, additional walls connected with said bottom walls defining a clear and unobstructed curved passage for said gas stream through said inlet and outlet passageways and through said expansion chamber above said rotor, a quiescent dust collection chamber communicating with a bottom portion of said rotor, and walls enclosing the remaining portions of said rotor between said expansion chamber and said quiescent collection chamber, the tip ends of the rotor blades being curved rearwardly relative to the direction of rotation, the under side of said rotor turning in the direction of movement of said gas stream and the upper side turning counter to said direction.

5. A collector for removing dust, fly ash and the like from a stream of gas comprising a power driven radial blade rotor, an inlet passageway directed downwardly toward an upper portion of the periphery of said rotor, said inlet passageway having a downwardly sloping bottom wall approaching the periphery of said rotor and forming an expansion zone in said passageway adjacent said rotor, an outlet passageway having a bottom wall extending from an upper portion of the periphery of said rotor, said inlet and outlet passageways defining a clear and unobstructed channel for said gas stream through said expansion zone and above said rotor, a quiescent collection chamber communicating with a bottom portion of said rotor, and walls enclosing said rotor between said passageways and said quiescent collection chamber, the under side of said rotor turning in the direction of movement of said gas stream and the upper side turning counter to said direction.

6. A collector as defined in claim 5 wherein said inlet passageway comprises a downwardly bending duct having a curved wall on the outside of the bend forming a continuation of said downwardly sloping bottom wall approaching said rotor.

7. A collector as defined in claim 5 wherein said inlet passageway has a down-turning reverse bend approaching said rotor, said bend having a wall on the outside of the bend continuous with said downwardly sloping bottom wall approaching said rotor, and said bend having a wall on the inside of the bend equipped with fluid inlet ports arranged to admit fluid into said passageway tangential to the beginning of the bend of said inside wall.

8. A collector as defined in claim 5 wherein said rotor is mounted on a horizontal axis, said inlet passageway has an arcuate bend about a horizontal axis parallel with the axis of said rotor, and the outside wall of said bend constitutes a continuation of said bottom wall approaching said rotor.

9. A collector for removing dust, fly ash and the like from a stream of gas comprising a power driven radial blade rotor, an expanding inlet passageway for said stream of gas directed toward the periphery of said rotor, said rotor being exposed to said stream of gas, an outlet passageway for said stream of gas extending away from said rotor at an angle to the direction of said inlet passageway, said inlet and outlet passageways defining a clear and unobstructed curved channel for said gas stream immediately adjacent said rotor, suction means communicating with said outlet passageway for drawing said stream of gas through said collector in streamlined flow, the tip ends of the rotor blades being curved rearwardly relative to the direction of rotation, the under side of said rotor turning in the direction of movement of said gas stream and the upper side turning counter to said direction, a quiescent dust collection chamber communicating with a bottom portion of said rotor, and walls enclosing the remaining portions of said rotor between said gas passageways and said quiescent collection chamber.

10. A collector for removing dust, fly ash and the like from a stream of gas comprising a power driven radial blade rotor, an inlet passageway for said stream of gas directed toward a portion of the periphery of said rotor, said rotor being exposed to said stream of gas to intercept gas borne particulate matter, an outlet passageway for said stream of gas extending away from said rotor at an angle to the direction of said inlet passageway, said inlet and outlet passageways defining a clear and unobstructed curved channel for said gas stream immediately adjacent said rotor, the side of said rotor adjacent said channel turning counter to the direction of movement of said gas stream, a quiescent dust collection chamber communicating with another portion of the periphery of said rotor, and walls enclosing the remaining portions of said rotor between said gas passageways and said quiescent collection chamber.

11. A collector as defined in claim 10 wherein said outlet passageway is horizontally disposed and said inlet passageway has a horizontal portion above said outlet passageway with a downwardly turning return bend communicating with said rotor and outlet passageway.

12. A collector for removing dust, fly ash and the like from a stream of gas comprising a rotor having longitudinal radial blades mounted on a horizontal shaft, an unobstructed gas passageway having a descending portion approaching said rotor in the direction of flow of the main stream of gas, said descending portion having a downwardly sloping bottom wall reaching its lowest point at said rotor for the gravity conveyance of wall borne materials to the rotor, said bottom wall forming the lower side of an expansion chamber in said passageway for the main stream of gas approaching the rotor and said passageway being curved in a direction to separate particulate matter toward said bottom wall by centrifugal action, the blades on an upper portion of said rotor projecting into the bottom of said expansion chamber to intercept gas borne particulate matter diverging from said main stream by said centrifugal action, a quiescent dust collection chamber communicating with a lower portion of said rotor, and walls enclosing the remaining portions of said rotor between the said expansion chamber and the quiescent chamber.

FRANCIS J. DOHRER.

References Cited in the file of this patent

UNITED STATES PATENTS

| Number | Name | Date |
| --- | --- | --- |
| 1,101,556 | Kurz | June 30, 1914 |
| 1,439,412 | Halliday | Dec. 19, 1922 |
| 1,445,069 | Cleland | Feb. 13, 1923 |
| 1,464,113 | Ryding | Aug. 7, 1923 |
| 1,563,125 | Ward | Nov. 24, 1925 |
| 1,725,100 | Pavlik | Aug. 20, 1929 |
| 2,047,568 | Lissman | July 14, 1936 |
| 2,221,385 | Rogers | Nov. 12, 1940 |
| 2,268,442 | Crawford | Dec. 30, 1941 |
| 2,491,840 | Veazey | Dec. 20, 1949 |

FOREIGN PATENTS

| Number | Country | Date |
| --- | --- | --- |
| 307,334 | Great Britain | Dec. 12, 1929 |
| 120,673 | Sweden | Nov. 20, 1947 |